(12) United States Patent
Parsadayan

(10) Patent No.: US 6,317,489 B1
(45) Date of Patent: **\*Nov. 13, 2001**

(54) ENTRY PHONE APPARATUS AND METHOD WITH IMPROVED ALPHABETICAL ACCESS

(75) Inventor: Walter Parsadayan, Lake Forest, CA (US)

(73) Assignee: Elite Access Systems, Inc., Lake Forest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/989,532

(22) Filed: Dec. 12, 1997

Related U.S. Application Data

(63) Continuation-in-part of application No. 08/681,615, filed on Jul. 7, 1996.

(51) Int. Cl.$^7$ .................................................. H04M 11/00
(52) U.S. Cl. ..................................... 379/102.06; 379/355
(58) Field of Search .................. 379/102.06, 110.01, 379/90.01, 428, 437, 440, 355, 354; 345/184

(56) References Cited

U.S. PATENT DOCUMENTS

| | | | |
|---|---|---|---|
| 4,278,845 | * 7/1981 | Chiou | 379/355 |
| 4,408,101 | * 10/1983 | Brodbeck | 379/355 |
| 4,937,855 | 6/1990 | McNab et al. . | |
| 5,027,111 | 6/1991 | Davis et al. . | |
| 5,125,078 | * 6/1992 | Matsuda et al. | 395/275 |
| 5,303,288 | * 4/1994 | Duffy et al. | 379/355 |
| 5,303,300 | 4/1994 | Eckstein . | |
| 5,475,741 | 12/1995 | Davis et al. . | |
| 5,627,531 | * 5/1997 | Posso et al. | 345/184 |
| 5,825,353 | * 10/1998 | Will | 345/184 |
| 5,854,831 | * 12/1998 | Parsadayan et al. | 379/102.06 |
| 5,905,964 | * 5/1999 | Sudo | 379/93.23 |
| 5,973,666 | * 10/1999 | Challener et al. | 345/184 |
| 5,982,861 | * 11/1999 | Holloway et al. | 379/102.06 |

OTHER PUBLICATIONS

Advertisement dated Apr. 1995 entitled "Tech Spec: Horizon "H" series", as it appeared in Security Dealer.

* cited by examiner

Primary Examiner—Stella Woo
(74) Attorney, Agent, or Firm—Oppenheimer Wolff & Donnelly LLP

(57) ABSTRACT

An access control apparatus has a visual display, a plurality of input keys, and an encoder, all of which are operably connected to a communication device. The communication device includes a memory and an electronic directory of names and associated codes. The electronic directory may be configured as a sequential data structure. In one embodiment, an encoder is associated with an alphabetical index and can be set to refer to a particular portion of the alphabet. Another embodiment utilizes a portion of the visual display itself to show the alphabet, and uses slew switches to allow movement within the alphabet. On the visual display, the communication device displays one or more entries from the electronic directory corresponding to the portion of the alphabet selected on the encoder or on the alphabet portion of the display. The apparatus may also include a scrolling device that enables a user to scroll through the electronic directory, beginning at the name or names that are displayed on the display.

21 Claims, 8 Drawing Sheets

ENTRY PHONE APPARATUS AND METHOD WITH IMPROVED ALPHABETICAL ACCESS

RELATED APPLICATIONS

The present application is a continuation-in-part of U.S. patent Ser. No. 08/681,615, which was filed on Jul. 7, 1996 and which is hereby incorporated by reference into the present application.

BACKGROUND OF THE INVENTION

1. Field of Invention

The present invention relates generally to access control apparatus and, more particularly, to access control apparatus which are connected to remote locations by a telephone system. Such access control apparatus are generally known as an entry phone system. Still more particularly, the present invention relates to such an entry phone apparatus and method in which alphabetical access to resident information is improved.

2. Description of the Related Art

Apartment buildings, office buildings, condominium complexes, gated residential communities, industrial parks and other secured locations often include a locked entrance and a security system for establishing communication between visitors who wish to enter the secured location and persons who are capable of unlocking the entrance from a remote location. One type of security system uses existing telephone systems to establish such communication. In such a system, an access control apparatus, or call box, is provided at the entrance. The call box, which includes a keypad and an auto-dialer, is connected to a telephone line and to the entrance lock. A numbered directory of persons, businesses or other parties capable of unlocking the entrance is provided by the call box itself or on a sign located adjacent to the call box. When the visitor enters a code number into the call box keypad, the call box automatically dials the telephone number corresponding to the code number. Once the identity of the person who wishes to gain access is established, the called party can unlock the entrance by pressing a predetermined number into the keypad of the called telephone.

One problematic aspect of traditional entry systems relates to finding the code number of a particular party within the directory. Some systems have used a slew switch or other scrolling device to allow a visitor to scan through the directory to find a particular name. This approach is relatively efficient only when the number of occupants is small. However, for a large building with many occupants, scrolling through the directory to find the name of a particular occupant is time consuming. In a busy complex with a high volume of people attempting to enter via the phone entry system, time delays at the entry system hinder the flow of entry and cause build-ups of people at the entrance.

Further, conventional entry phones which have an alphabetical (i.e., sequential) list of residents names and phone codes, generally require a visitor to scan through the alphabetical entries sequentially, and do not provide for a visitor to scan from "B" to "Y", for example, by going backwards though the list through "A", and then through "Z" to reach "Y". That is, the list is closed-ended at each end of the alphabet. Thus, visitors are required to spend an increased amount of time scanning through such a list presentation before they are able to find the entry for the resident they wish to contact.

An additional disadvantage of conventional entry phones is the large size of the display which must be used in order to display a number of resident names and dialing codes. These large size displays increase the initial cost of the entry phone device, and also have disadvantages including increased vulnerability to vandalism, increased heat dissipation, increased power supply requirements, greater susceptibility to high temperatures, and increased maintenance requirements. Also, the problem of providing shading from sunlight (which can obscure the display when it reflects toward a user) is greater with a large display. Housings for the conventional entry phones also must be larger to accommodate the large conventional displays.

Accordingly, a need exists for an access control apparatus that increases the speed in which a visitor can locate the name of a building occupant in an electronic directory.

SUMMARY OF THE INVENTION

A general object of the present invention is to provide an access control method and apparatus that is superior to those presently known in the art. In particular, one object of the present invention is to provide an access control method and apparatus that allows a visitor to find the name of an occupant in an electronic entry-system directory more quickly than in present systems.

These and other objectives are accomplished in one embodiment of the present invention by providing an access control apparatus comprising an encoder. The visitor sets the encoder in a position corresponding to a particular letter in the alphabet. The encoder provides a code to a microprocessor indicating which alphabetical character in the directory the visitor wants to see. The system displays an entry in the electronic display corresponding to the letter of the alphabet that the visitor has selected. Ordinarily, this displayed entry (or entries) will be the first one(s) in that portion of the of the alphabetical directory having names starting with the letter the visitor has selected by use of an input to the encoder. The visitor can then use a scrolling device to scroll through that section or adjacent sections of the directory to find the particular name and associated telephone code for which he or she is looking.

These and other objectives are accomplished in another embodiment of the present invention by providing an access control apparatus comprising a pair of slew switches and a display of the characters of the alphabet with one character indicated for display of the corresponding section of the alphabetical resident list. The visitor uses the slew switches to indicate the alphabetical character with which the last name of the selected resident starts. Then the display will show the corresponding section of the alphabetical list, and the visitor uses slew switches to scan through the list until the selected resident's name is located.

Yet another feature of the present access control apparatus and method is an indicator pointing to a particular displayed resident name. The name being indicated can be changed by a visitor by scanning through the names of residents using the slew switches. When the selected resident's name is indicated, the visitor can dial the indicated code number to ring that residents name in order to request entry to the apartment complex, for example. Alternatively, the visitor can push a single "Call" button associated with the indicator of the display, and the access control apparatus will automatically extract that resident's calling code from the stored list and ring the resident's telephone. In this way, further time savings are realized by the present access control apparatus and method.

It is seen in view of the above, that a visitor can locate a particular occupant's name and corresponding code more quickly with the present invention than with existing systems, particularly in large complexes having many occupants listed in the electronic directory. The visitor can alternatively ring the resident's telephone without having to dial in a code number if a single-button "Call" feature is provided. The visitor can begin scrolling through the directory at a particular letter of the alphabet, rather than at the first entry in the directory. Further, the visitor is not blocked from scanning past the end of the alphabet (i.e., beyond "Z", or backward from "A") because a "circular" or "closed loop" configuration of the alphabetical residents list is provided. Thus, the visitor can save time if, for example, "B" is being displayed when the visitor arrives and the visitor wishes to call a resident with a last name starting with the letter "U". In this case, rather than scanning entirely through the alphabet from "B" to "U" (separated by 18 other characters) as conventional access control systems require, the visitor will scan backward from "B" through "A-Z-Y-X-W-V" and to "U". Further, the visitor can scan past entire sections of the alphabetical list without having these sections shown on the display. That is, the visitor uses slew switches to move an indicator along the A-B-C display from "B" to "U", without scanning the intervening sections of the list. The display immediately "jumps" to showing the beginning portion of the selected section of the list. Then the visitor can quickly scan this section for the selected resident's name.

Since the visitor can quickly locate the occupant in the directory, the visitor spends less time at the telephone entry system than with prior art systems, and the flow of visitors into the complex is made more efficient.

In accordance with an embodiment of the present invention, an access control apparatus includes a visual display, a plurality of input keys, and a facility for indicating which section of the alphabetical list is to be displayed. That is, the "A" section, the "B" section, etc., may be selected by the visitor directly, and without scanning through other sections of the alphabetical list. These elements of the system are all operably connected to a communication device. The communication device includes an electronic directory of names and associated codes. The indicating facility is associated with an alphabetical index and can be set to refer to a particular portion of the alphabet. The indicating facility may be implemented by use of an encoder and knob with a pointer or a slider with a pointer associated with a display of the alphabet, for example. Alternatively, the indicating facility may be implemented by use of a display device which in one mode of operation displays the alphabet and has an indicator. For example, one character of the alphabet may be highlighted or shown in reversed contrast. In another mode of operation, or on another portion of the visual display, the device displays one or more entries from the electronic directory corresponding to the letter of the alphabet selected with the indicating facility. The system will generally also include a scrolling device to enable a user to scroll through the electronic directory, beginning at the name or names that are displayed on the visible display device.

In accordance with another embodiment of the present invention, an access control apparatus is provided with a visual display and an indicating facility as described above, and is operably connected to a telephone system. The access control apparatus has a housing that includes a plurality of keys arranged in predetermined locations allowing a visitor to dial a resident's telephone code, or allowing a visitor (such as a maintenance or utility worker) to dial a security access code to gain access to the facility. Further, the apparatus is provided with an indicator associated with the visual display device, and with a single-button call facility. The indicator at the visual display may, for example, be an arrow on or associated with a single-button "Call" facility. The single-button "Call" facility may have a dedicated call button, or may utilize one of the keys of the plurality of keys, so that when the visitor pushes this button or key, the residents telephone code is automatically retrieved from the electronic list, and that residents phone is caused to ring for the visitor.

This single-button "Call" feature further shortens the time visitors must spend to locate and contact a resident of a facility. Further, it eliminates "wrong number" calls by visitors who either read or dial in the resident's code number incorrectly, and thus, mistakenly ring the phone of the wrong resident.

In accordance with still another embodiment of the present invention, an access control apparatus is provided for use with a security system that is operably connected to a telephone system. The access control apparatus has a housing that includes a plurality of keys arranged in predetermined locations. There is an electronic communication device within the housing that includes an electronic directory of names and associated dial codes stored in alphabetical order in memory. A microphone, a speaker, a visual display and a rotatable encoder are operably connected to the communication device. The encoder can be rotated to any of a number of positions, each position corresponding to a particular letter of the alphabet. At least one entry from the electronic directory corresponding to the selected letter of the alphabet is displayed on the visual display.

The apparatus may optionally include both an outer housing and an inner housing that is removably mounted within the outer housing. The microphone, speaker, visual display and rotatable encoder may be associated with the outer housing, with the electronic communication device being associated with the inner housing. The communication device may then be conveniently removed for repair or replacement.

An advantage that results from the present invention is that an entry phone can be provided with a smaller display than is required by conventional entry phone devices, and can still provide as fast or faster access for visitors to the list of resident names. Thus, the traffic flow of visitors to and from an entry phone utilizing the present invention can be expedited.

Many other features and attendant advantages of the present invention will become apparent as the invention becomes better understood by reference to the following detailed description considered in conjunction with the accompanying drawings.

BRIEF DESCRIPTION OF THE DRAWINGS

Detailed description of the preferred embodiment of the invention will be made with reference to the accompanying drawings.

DETAILED DESCRIPTION OF THE PREFERRED EMBODIMENTS

The following is a detailed description of the best presently known modes of carrying out the invention, which may be implemented in any one of the alternative embodiments depicted and described herein. It is to be understood that the invention is capable of being implemented in other embodiments. Accordingly, this description is not to be taken in a limiting sense, but is made merely for the purpose of illustrating the general principles of the invention. The scope of the invention is defined solely by the spirit and scope of the appended claims.

Figure 1:
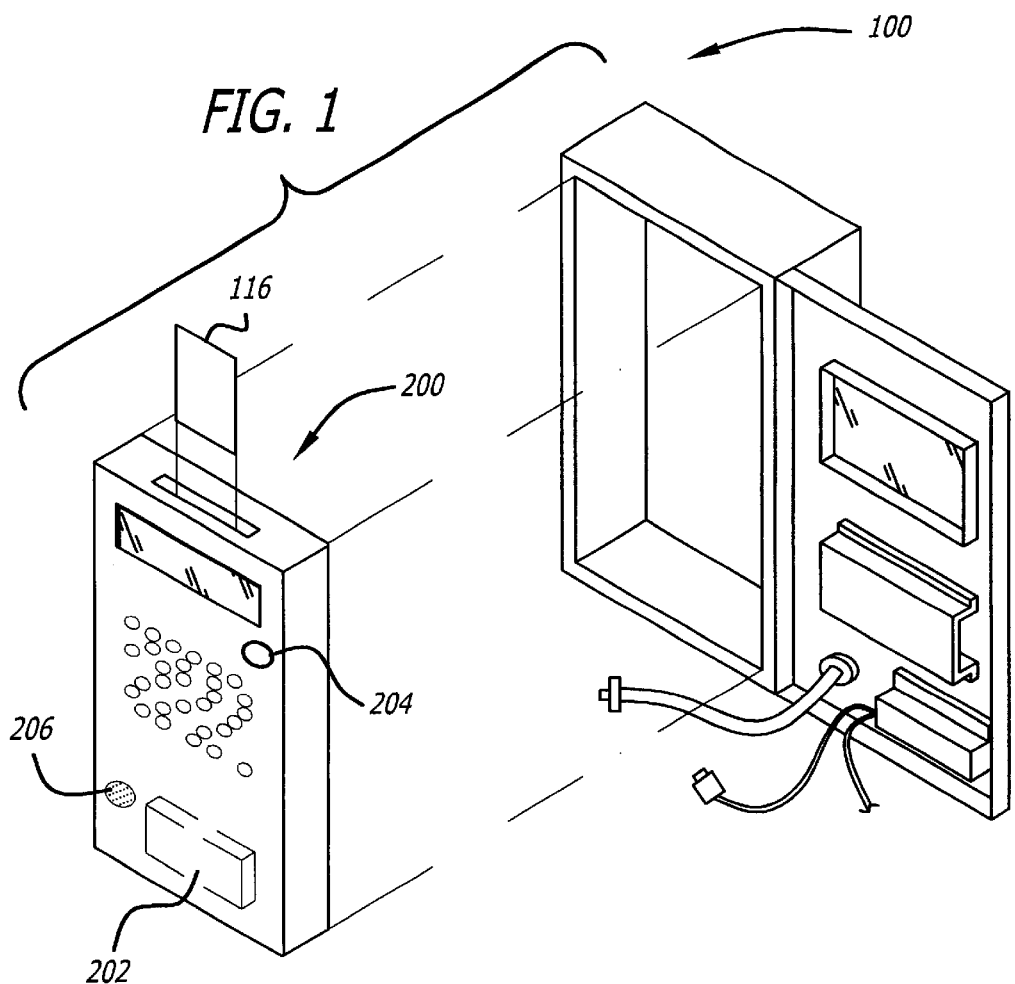
FIG. 1 is an exploded view in accordance with a preferred embodiment of the present invention.

As illustrated in FIG. 1, one example of the present access control apparatus includes an outer housing 100 and an inner housing 200 which may be removably mounted within the outer housing. Within the inner housing 200 is an electronic communication device 202 (diagrammatically depicted in FIG. 9 and discussed in detail below) that may be connected to a telephone system. In accordance with the exemplary embodiment, the inner housing 200 may also include a microphone 204 and a speaker 206.

Figure 2A:
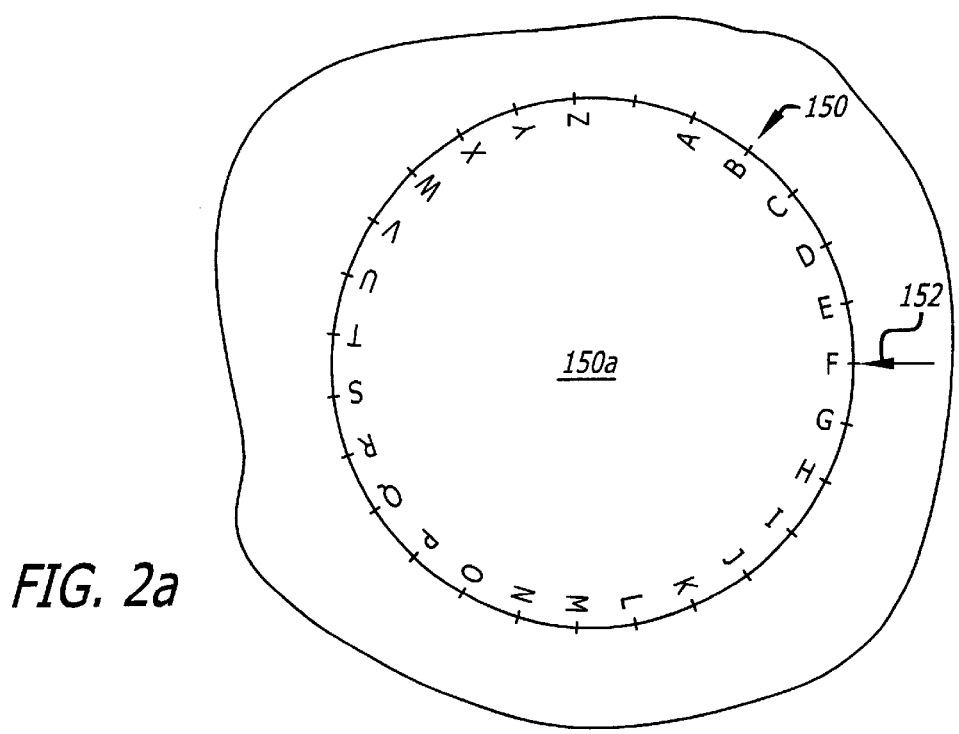
FIG. 2a provides an enlarged fragmentary view of a portion of FIG. 2.
Figure 2:
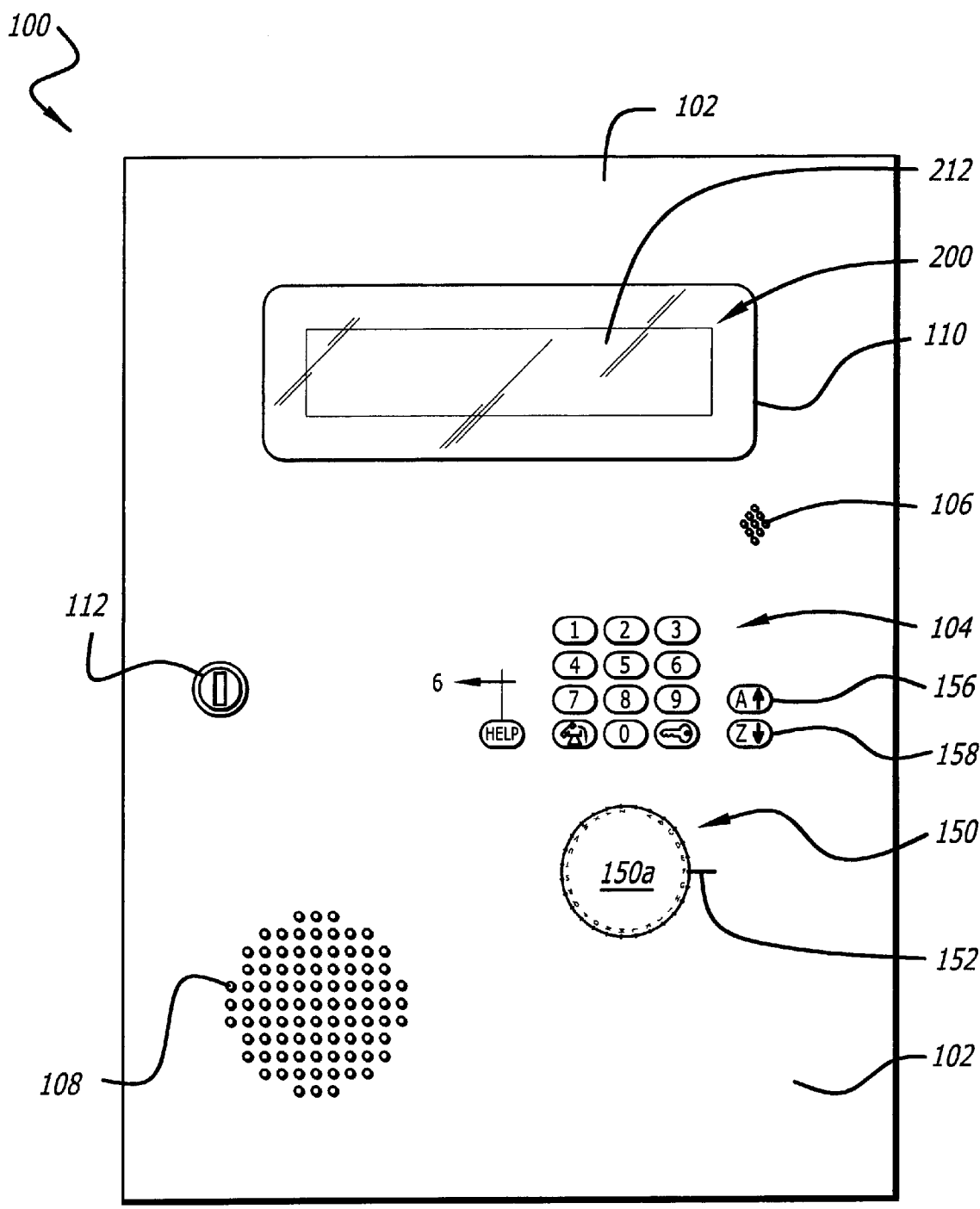
FIG. 2 is a front elevation view of the preferred embodiment shown in FIG. 1.

The front panel 102 of the exemplary outer housing 100 is shown in FIG. 2. FIG. 2a shows an enlarged fragmentary view of the outer housing 100. The front panel 102 includes a plurality of movable outer keys 104, microphone apertures 106 and speaker apertures 108. A window 110 for providing visual access to the inner housing 200 may also be provided. In those instances where the front panel 102 also serves as a door, as in the exemplary embodiment, a lock 112 may be mounted thereon.

Figure 4:
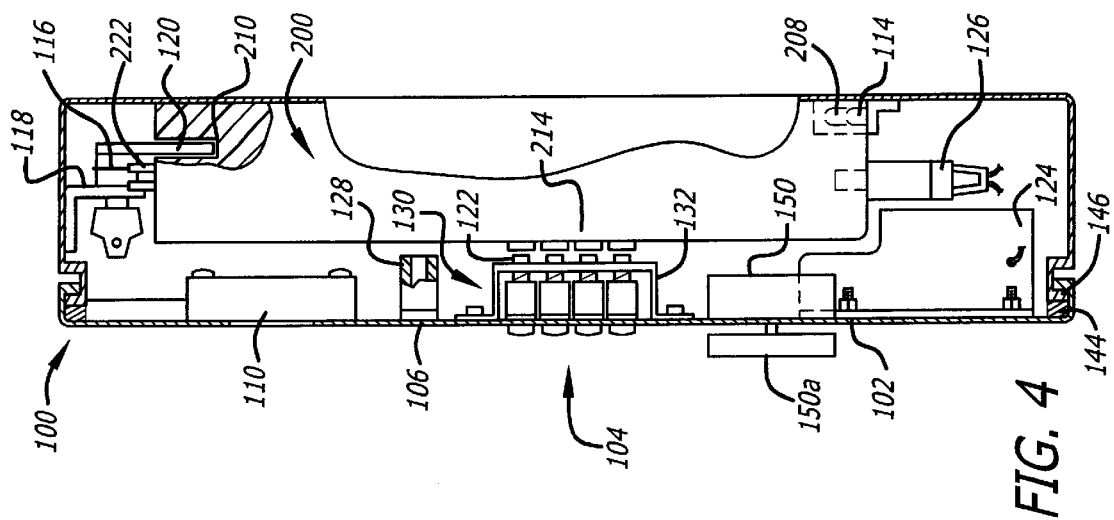
FIG. 4 is a section view taken along line 4—4 in FIG. 3.
Figure 3:
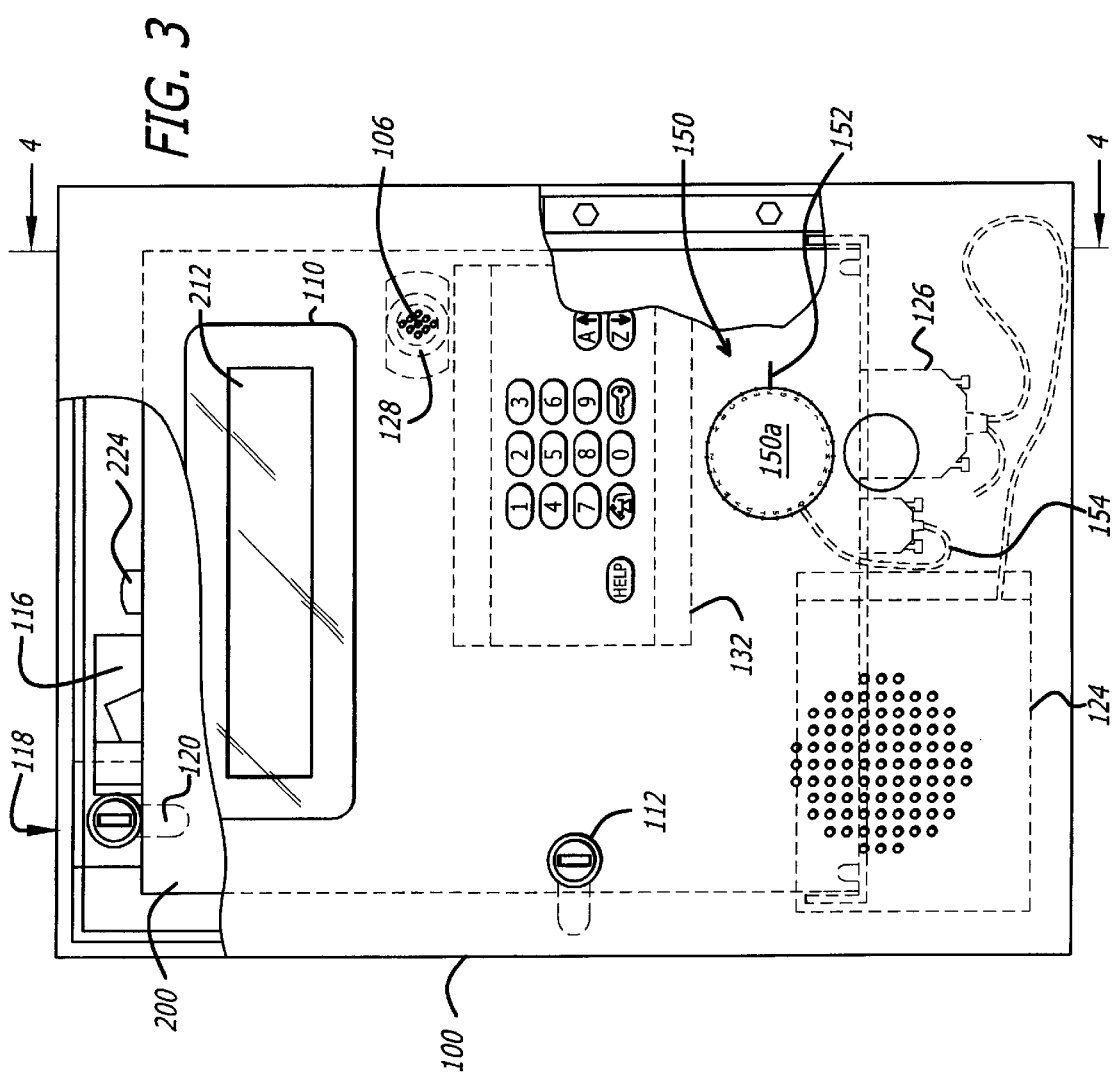
FIG. 3 is a partial section and front elevation view of the preferred embodiment shown in FIG. 1.
Figure 5:
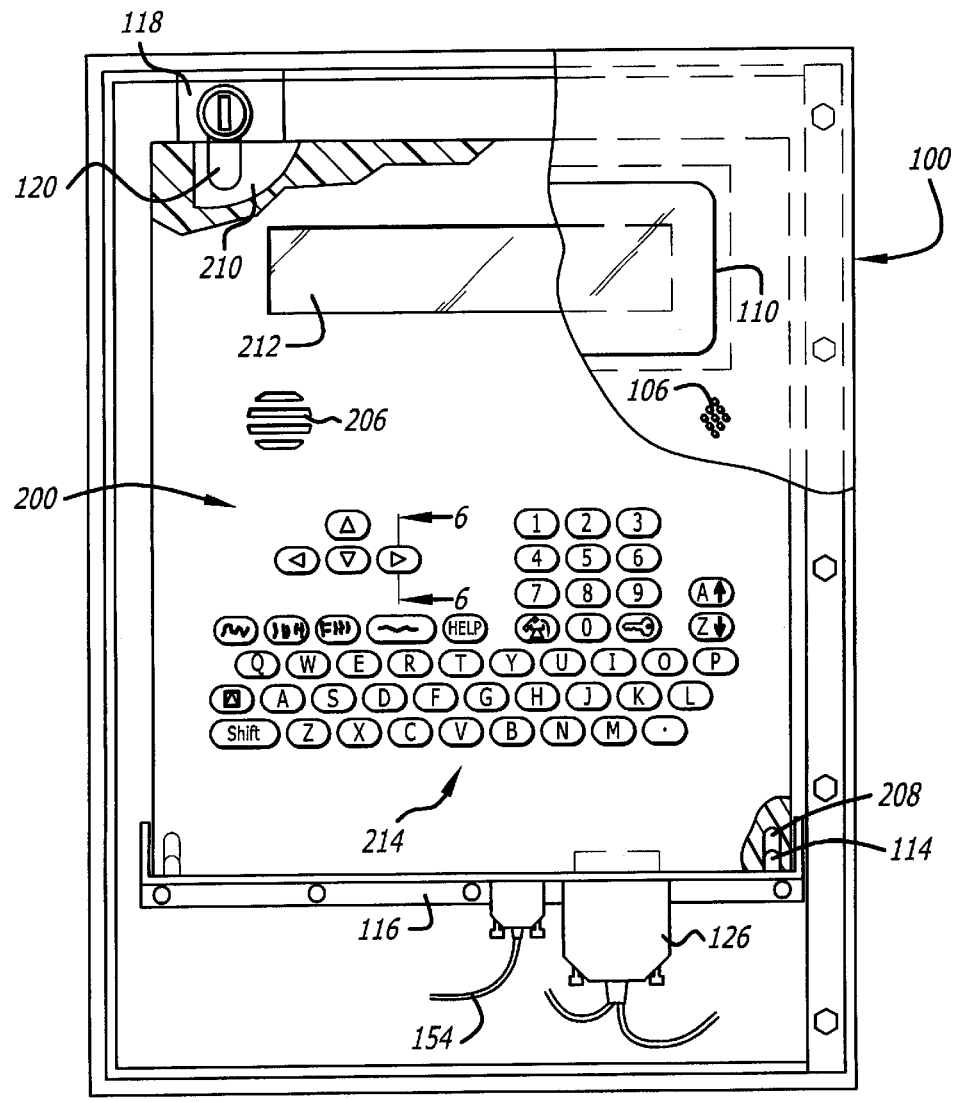
FIG. 5 is a front elevation and partial section view of the interior of the preferred embodiment shown in FIG. 1.

As shown by way of example in FIGS. 3–5, the outer housing 100 includes mounting pins 114 that are received by mounting apertures 208 in the inner housing 200. The mounting pins 114 may be mounted on a shelf 116 which vertically supports the inner housing 200. A locking device 118, which includes a pivotal locking tab 120, cooperates with a locking recess 210 that is formed in the inner housing. After the inner housing mounting apertures 208 have been placed over the mounting pins 114, the locking tab 120 may be pivoted to the locked orientation shown in FIGS. 3–5. Once the inner housing 100 is in place and the outer housing 200 is closed, a gasket 144 and abutment 146 seal the outer housing and prevent moisture from entering the outer housing.

A visual display 212, which may be provided on the inner housing 200, is aligned with the window 110. The visual display 212 is preferably a multi-line LCD display that is back-lighted for evening use. However, displays such as vacuum fluorescent displays, plasma displays, light emitting diode displays and cathode ray tube displays may also be used. The window 110 is preferably a thick (approximately ¾ of an inch) protective lens. Suitable lens materials include materials which are capable of withstanding significant blows such as acrylic.

The inner housing 200 may also include a plurality of inner keys 214 which correspond to the numbers 0–9 and the letters A-Z. Additional keys, such as scroll keys and space keys, can also be provided for other functions. The inner and outer keys are respectively arranged such that, at a minimum, the like numbered inner keys are aligned with the like numbered outer keys. Other function keys may also be aligned. The outer keys 104 each include a longitudinally extending element 122 which will actuate a corresponding inner key 214 when an outer key 104 is depressed. A speaker 124, which may be connected to the inner housing 200, is provided within the exemplary outer housing 100. The speaker 124 is connected to the inner housing 200 by a connector 126.

Figure 10A:
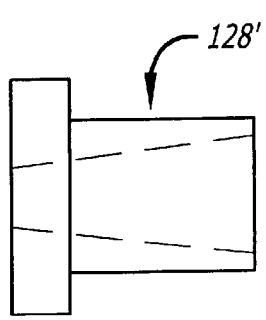
FIGS. 10a and 10b are side views of microphone conduits in accordance with one aspect of the present invention.
Figure 10B:
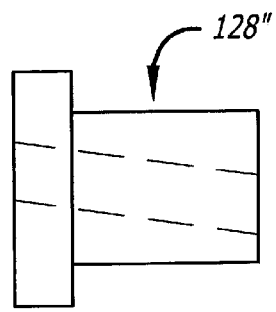

The outer housing 100 may also include a hollow conduit 128 which extends from microphone apertures 106 to the microphone 204. The conduit 128 improves the transmission of sound from the exterior of the outer housing 100 to the microphone 204 on the inner housing 200. In addition, as shown in FIGS. 10a and 10b, the inner surface of the conduit 128 may be slanted downwardly toward the exterior of the housing so that moisture within the conduit will be driven by gravity toward the exterior of the housing and away from the microphone 204. For example, the inner surface of conduit 128' is in the form of a cone (FIG. 10a) and the inner surface of conduit 128" is in the form of a slanted cylinder (FIG. 10b).

Figure 6:
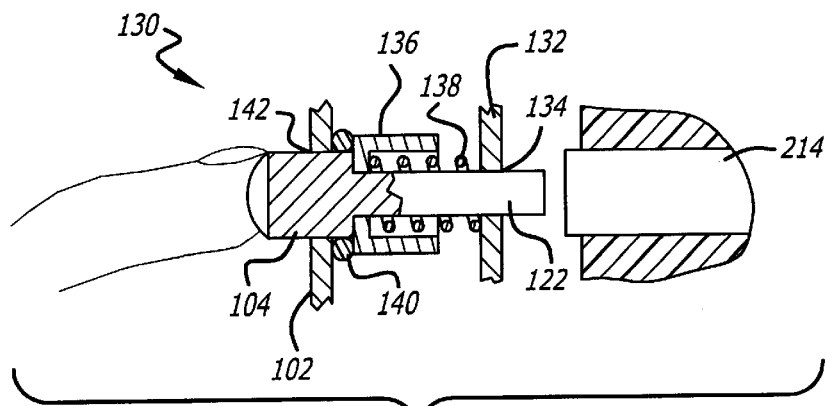
FIG. 6 is a section view taken along line 6—6 in FIG. 2.

In order to prevent damage to the inner keys 214 and to the inner housing 200 itself which could be caused when an excessive force is applied to the outer keys 104, the exemplary outer housing 100 further includes a blocking arrangement 130. Referring to FIGS. 4 and 6, the blocking arrangement 130 includes a bracket 132 having a series of apertures 134 that respectively allow passage of the longitudinally extending elements 122. A radially extending element 136, the diameter of which is too large to pass through the corresponding aperture 134, is secured to each of the longitudinally extending elements 122. As an outer key 104 is depressed, the radially extending element 136 will strike the bracket 132 and prevent the longitudinally extending element 122 from moving beyond a predetermined point. The predetermined point corresponds to the location necessary to actuate the corresponding inner key 214. Springs 138 are used to outwardly bias the outer keys 104 and an o-ring type seal 140 may be used to prevent dirt, moisture and other contaminants from entering the interior of the outer housing 100 through the space between the keys 104 and key apertures 142.

Figure 7:
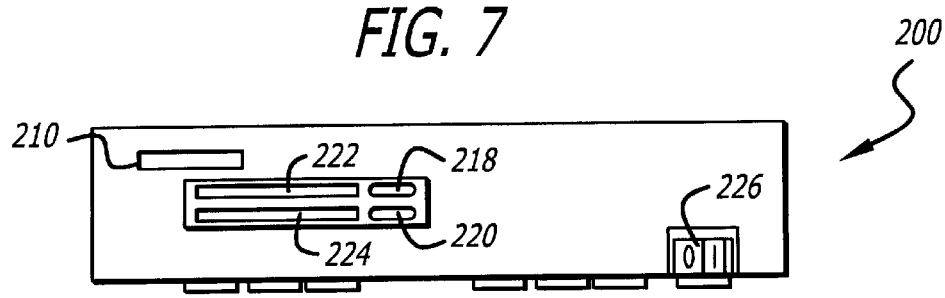
FIG. 7 is a top view of an exemplary inner housing.
Figure 8:
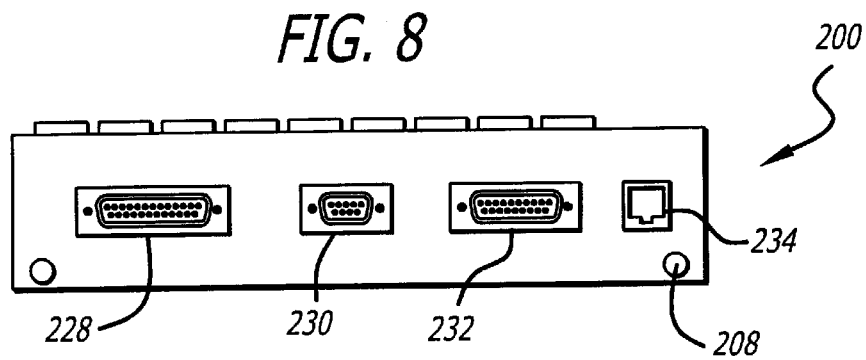
FIG. 8 is a bottom view of an exemplary inner housing.

Referring now to FIGS. 1, 7 and 8, the inner housing 200 may be provided with one or more non-volatile RAM memory modules 216, such as PCMCIA memory cards. The memory modules 216 may be used to store data such as code numbers, names, telephone numbers, and settings that are dictated by the time of day and day of the week. One end of the inner housing 200 includes a pair of memory module ports 218 and 220 which are adapted to receive the memory modules. The ports 218 and 220 are connected to the communication device 202 and include eject buttons 222 and 224. A power on/off 226 switch is also provided on the inner housing. The other end of the exemplary inner housing 200 includes a parallel printer port 228, an additional port 230 which may be used to connect the inner housing to a card reader, radio receiver or other device, a connector 232 which receives the connector 126 associated with the speaker 124, and a telephone line jack 234.

In accordance with the illustrated embodiment, the interior of the inner housing 200 is not readily accessible because the electronic devices housed therein will not normally be repaired by field technicians. As noted above, the inner housing 200 is normally replaced by the field technician with a like unit if it has sustained damage. Thus, the inner housing 200 may be closed with screws or other semi-permanent mechanical fasteners.

Figures 1, 9:
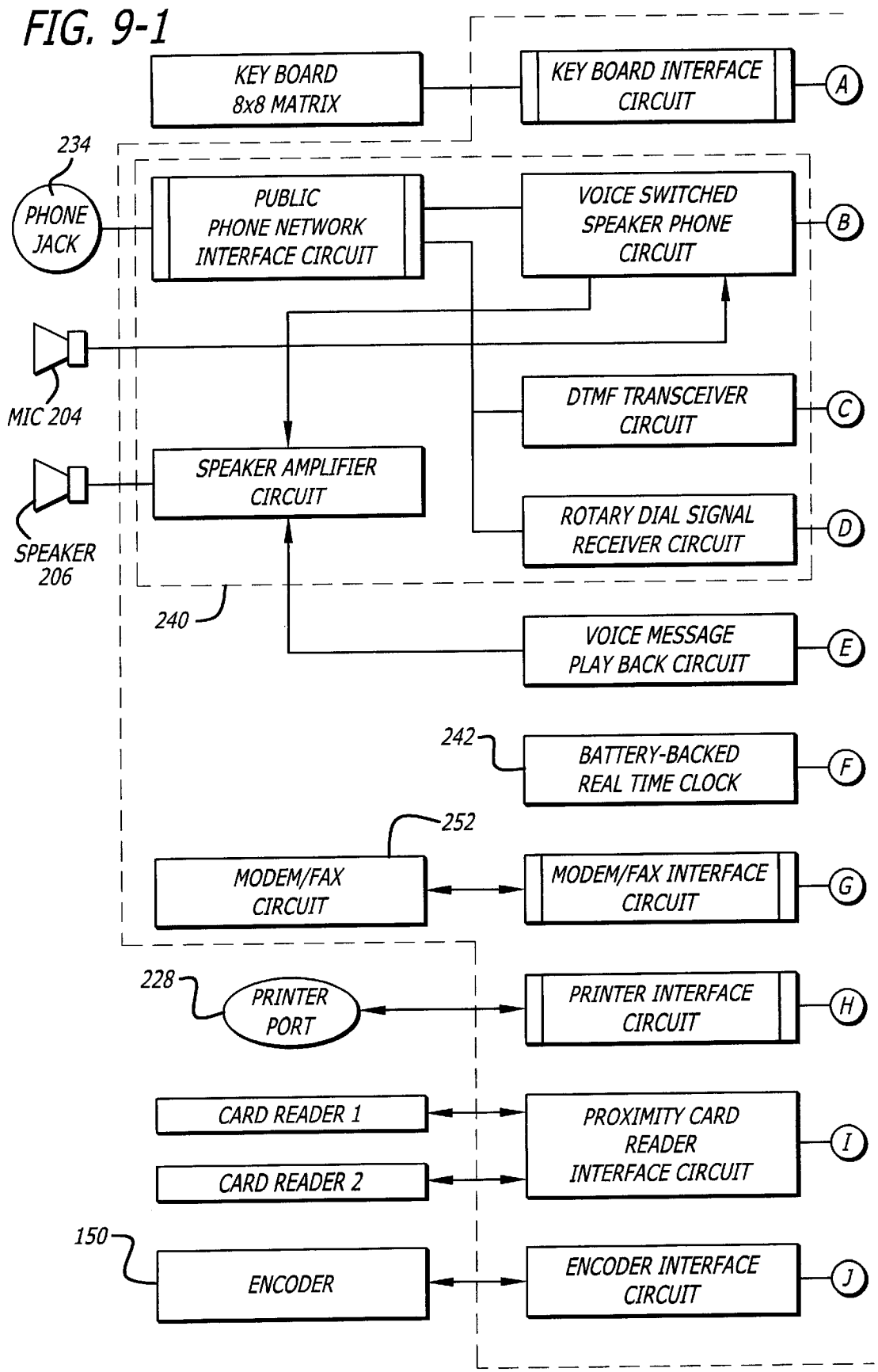
FIG. 9 is schematic view of an exemplary communication device.
Figures 2, 9:
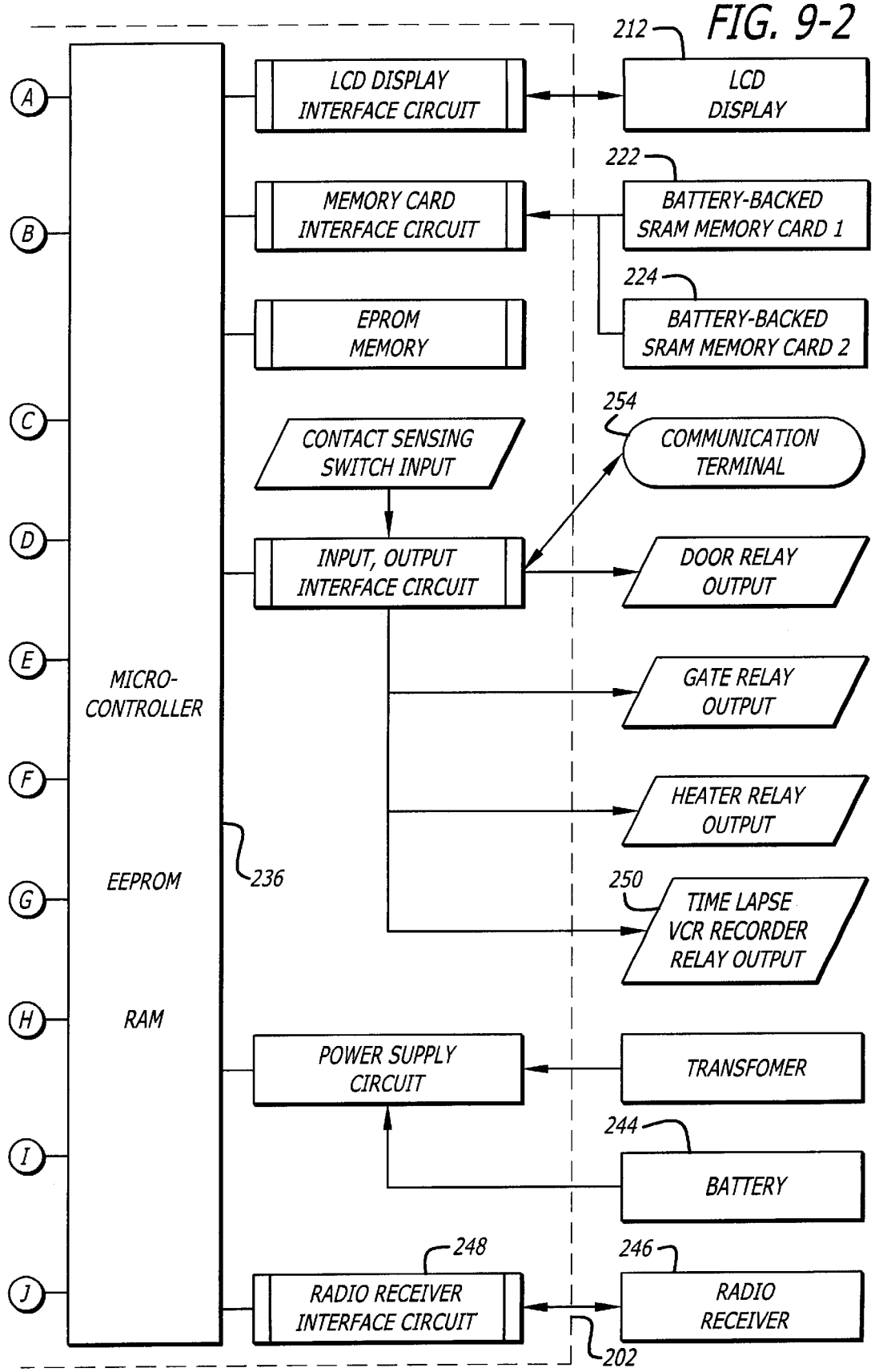

As illustrated for example in FIG. 9, the communication device 202 includes a programmable-logic micro-controller 236 (although other suitable devices such as a programmable microprocessor, or a special purpose ASIC [application specific integrated circuit] type of processor may also be used) as well as a EPROM memory 238, telephone circuitry 240, a non-volatile real time clock/calendar 242, and an eight (8) hour back-up battery 244 are also provided. The connection of the communication device 202 to other aspects of the exemplary inner housing 200 is also shown. In addition, should radio contact with the access control apparatus be desired, a radio receiver 246 and the associated circuitry 248 may also be provided. In order to produce a record of all persons who use the access control apparatus, a video camera (and recorder) may be appropriately positioned nearby and the microprocessor 236 may be programmed so as to produce a "video record" signal during a predetermined time interval each time the keys 104 are touched. [Note VCR output 250.]

Considering another aspect of the present invention, a conventional incremental rotary encoder 150 is provided with a knob or dial 150a outwardly exposed on the outer housing 100 and having the letters of the alphabet about its face (FIGS. 2 and 2a). An index mark or selector/indicator 152 is provided on the housing 100. It will be understood that, alternatively, the indicator mark may be on the knob 150a, and the letters may be on the housing 100. The encoder 150 has a detent position associated with each letter of the alphabet. The user rotates the encoder to select the particular letter of the alphabet with which the desired occupant's name begins. It will be recognized that the present invention is not limited to any particular rotary encoder, or even to use of a rotary encoder. For example, a linear encoder could be used with a linear (as opposed to circular) display of the alphabetical letters.

An advantage of the circular (i.e., rotary) encoder and circular display of the alphabet is that a user of the device can move most quickly from one portion of the alphabet to another. That is, to move from "Y" to "B" the user need not scan through the entire alphabet, but can rotate the knob 150a through the "Z" and "A" positions to reach "B". The encoder 150 allows unlimited rotation in either direction, and in response to such rotation by a user of the device provides a train of pulses which in phase and number indicate to the microprocessor 236 the direction and distance of movement in the electronic list of resident's names stored in the memory associated with this microprocessor 236.

By use of internal programming, the microprocessor 236 keeps track of a present position in the alphabetical list, and (by reference to the pulse train from encoder 150) of the position in the alphabetical listing to which a user wants to move by rotary input to the knob 150a. For example, if the user wishes to look up the dial code for someone named "Smith," the user would rotate the dial of the encoder until the letter "S" aligns with the selector/indicator 152. The encoder 150 then indicates to the micro-controller 236 (or microprocessor) that the user has selected the letter "S". The micro-controller 236 retrieves a selected occupant's last name that begins with the letter "S" from the database, along with the dial code that corresponds with that occupant, and displays the name and dial code on the display screen 212, as is further explained below. In this embodiment, the encoder 150 connects to the inner housing by way of ribbon connector 154. The ribbon connector 154 may connect into port 230, or an additional port may be provided especially for the encoder. The display screen 212 can be a single line or multi-line display. If the display is a single line display, only one name and the dial code that corresponds with that name are displayed on the display. On the other hand, if the display is a multi-line display, the microprocessor 236 will display a sequence of names in alphabetical order from the database, as will be further explained below.

In either case, the micro-controller 236 can be programmed to display the first name or names in the database that correspond with the selected letter. That is, the names may be stored in the database as $N_{\alpha,\beta}$, where $\alpha$ is the letter with which the name begins (i.e., a,b, . . . z) and $\beta$ corresponds to a particular name (1,2, . . . n, where n is the total number of names beginning with the letter $\alpha$ that are stored in the database). The micro-controller can be programmed to first display name $N_{\alpha,1}$ for a single line display, or multiple names and codes beginning with $N_{\alpha,1}$ for a multi-line display. For example, for a five line display, the micro-controller may display names $N_{\alpha,1}$ through $N_{\alpha,5}$. If there are fewer than five names in the database that begin with the letter $\alpha$, the micro-controller displays the next successive names from the database, in alphabetical order. If there are no names that begin with the letter $\alpha$ stored in the database, the next available names in the database are displayed.

There are a number of available programming expedients available to close the sequential alphabetical listing of resident's names into a "circular" or "closed loop" form of listing. As mentioned above, the result of this closure of the sequential listing is that a visitor can scan back and forth between the "A" and the "Z" portions of the alphabetical listing. One efficient and particularly preferred method of closing this sequential listing of resident's names is to provide programming causing microprocessor 236 to store two additional addresses, one associated respectively with the first "A" name, and the other associated with the last "Z" name of the alphabetical listing. Each of these stored addresses indicates the address where the other of the first "A" name and last "Z" name of the alphabetical listing is located. Consequently, when a visitor makes a command for a movement within the alphabetical listing and this command passes the first "A" name or last "Z" name in a direction toward the end of the listing, the microprocessor 236 accesses the respective one of the stored additional addresses, and uses the one of these two additional addresses obtained in this way to find the other end of the alphabetical listing of resident's names. Consequently, the display will appear to a human to "jump" between "A" and "Z" names.

In the event that any section of the alphabet is without a resident's name, the system can be programmed to display a message indicating that there are no occupants having a last name that begins with the letter that the user has selected.

Once the system has displayed a name or names on the display 212, the user can then employ scroll keys 156, 158 to scroll through the directory alphabetically to find a particular name. For example, if the name $N_{\alpha,1}$ were to be displayed, the user could scroll forward through names $N_{\alpha,2}$, $N_{\alpha,3}$, etc. by depressing the scroll button 156. Conversely, the user could scroll backward through the directory by depressing the scroll button 158. As an alternative to using scroll buttons 156, 158, a slew switch or other conventional scrolling device (not shown) could be employed.

As an alternative to initially displaying the name $N_{\alpha,1}$ for a particular letter α, the system can be programmed to display an intermediate name $N_{\alpha,1+\delta}$ where δ is determined based upon how many names beginning with a given letter α are stored in the directory. For example, suppose the following names beginning with the letter "S" were stored in the directory:

Salter

Sebald

Sidrick

Sodderly

Sundstrom

For a single line display, the system could be programmed to display the intermediate name "Sidrick" when the user has selected the letter "S" with the encoder 150. The user could then use the scroll buttons 156, 158 to scroll forwards or backwards through the names, beginning with the letter "S". An advantage of this approach becomes apparent when there are a large number of names beginning with a particular letter. By initially displaying a name that is ranked alphabetically in the middle of the names that begin with "S", the system can often reduce the amount of time a user must spend scrolling through the database to find a particular name.

Figure 11:
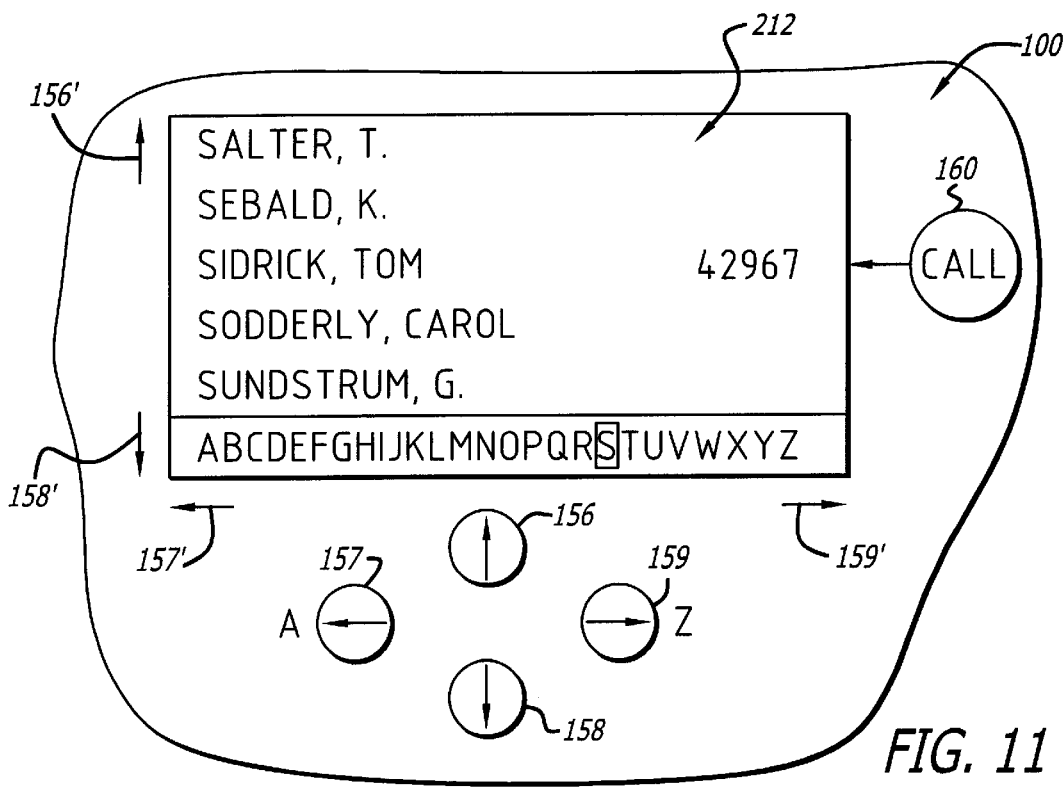
FIG. 11 shows an alternative configuration of a visual display and alphabetical slew switches associated with the display, as well as a single-button call facility associated with this display.

Attention now to FIG. 11, and contemporaneous consideration also of the alternative embodiment of the display 212 there illustrated may be helpful in understanding alternative display possibilities with the present invention. Because the visual displays 212 of the alternative embodiments of the invention are all user (i.e., visitor) interfaces, they are all generally indicated in the various drawing FIGURES using the numeral 212. In this case, the visual display 212 provides for 6 lines of information to be displayed, the top five lines of which are being used to display the same five names set out above. The bottom line of the display 212 is being used as an "A-B-C" display (i.e., a display of the alphabet itself) and displays the alphabetical characters from "A" through "Z". In this case, the letter "S" is indicated (i.e., highlighted or shown in reversed contrast, for example), indicating that the "S" portion of the alphabet is being accessed for scrolling.

In this case, rather than using an encoder to indicate to the microprocessor 236 which section of the alphabetical resident list a visitor wishes to view, two additional push-button keys 157 and 158 are provided. These keys 157 and 159 act as slew switches, moving the indicator on the "A-B-C" portion of the visual display 212. In order to further the connection between the functions of the keys 156, 157, 158, and 159, and the portion of the electronic resident list displayed in the window 110 by use of visual display 212, the arrows 156', 157', 158', and 159', may be provided on the outer surface of the housing 100.

In this illustrated case of FIG. 11, the name "Sidrick, Tom," and the telephone access code 42967 is being displayed. The access codes will generally be arbitrary, and will not be apartment numbers, but are numbers the visitor read off of display 212, and then must correctly enter on the key pad on the exterior of housing 100 in order to cause the telephone of the selected resident to ring. However, in this case, the display 212 is also indicating a particular name on the display (i.e., by highlighting, reverse contrast, or an arrow in the display or on the housing 100, for example).

Associated with the display 212, is a single-button call key 160, which when pressed causes the microprocessor 236 to retrieve the calling code for the indicated resident, to enter this code into the telephone interface, and thus causes the indicated resident's telephone to ring.

Figure 12A:
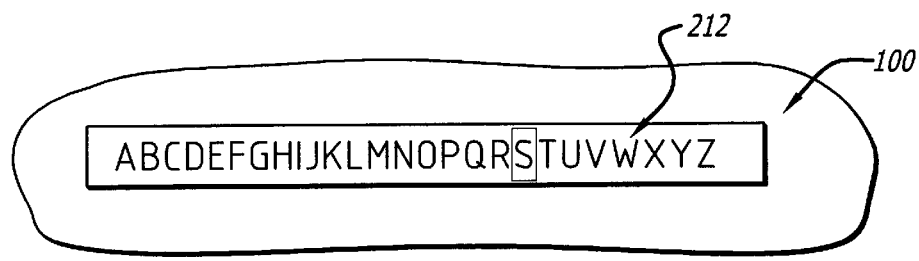
FIGS. 12a and 12b provide respective fragmentary views similar to that of FIG. 11, but showing an alternative embodiment using a visual display of smaller size, and which operates in either one of two alternative display modes.
Figure 12B:
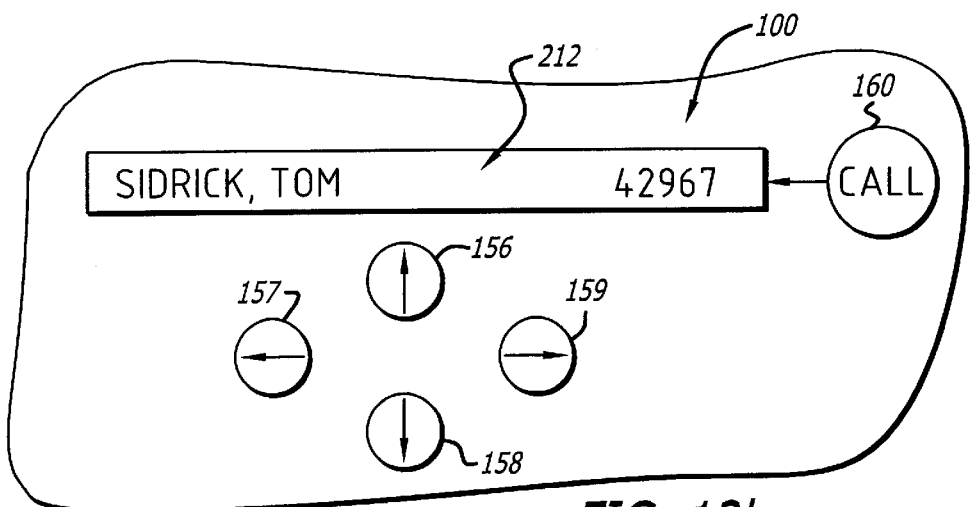

Considering now FIGS. 12a and 12b, another alternative embodiment of device having a single-line, but dual-mode visual display 212 is depicted. In this case, the display 212 is driven by microprocessor 236 to display a single line from listing 300 as seen in FIG. 12b, or a single line of alphabetical listing, with one character indicated, as is seen in FIG. 12b. Slew switch buttons 157 and 159 are used by a visitor to scan through the alphabet itself, and cause the display to show the alphabet as seen in FIG. 12b. When the visitor has selected the appropriate alphabetical section, the visual display reverts to the mode seen in FIG. 12a, allowing the visitor to scan within an alphabetical section, as explained above.

Considering another aspect of an embodiment of the present invention, a modem interface/facsimile circuit 252 may also be provided which allows the present access control apparatus to transmit information regarding the status of various hardware settings such as, for example, volume settings and contrast settings. Through the use of so-called digital potentiometers, these hardware settings may then be adjusted from a remote location. Such adjustment may be accomplished by transmitting specific DTMF codes with a touch-tone phone or by modem-to-modem communication with a personal computer or with another access control apparatus. The exemplary embodiment also includes a communication terminal 254, such as a RS485, RS232 or other current loop communication device, that may be used to communicate with remote devices such as gate operators. Data and command sequences may be transferred between the access control apparatus and one or more gate operators. As such, the access control apparatus may be used to determine the current status of the gate operators and their various accessories and then fax or modem this information to a service center. Similarly, a service center may modem or fax the access control apparatus to request a report or to reprogram or control the gate operators.

Another advantageous feature of the present invention is a "panic alarm" which allows the control apparatus to be used to call the security company associated with the location. More specifically, either single or multi-digit panic code for use by all persons associated with the location or individual panic codes for each person or tenant may be assigned. When the panic code is input into the keypad, the control apparatus will call the security company and establish voice communication with the security company so that the situation may be assessed and handled in the appropriate manner. In those instances where a video camera is employed, video images may also be transmitted to the security company.

Although the present invention has been described in terms of the preferred embodiment above, numerous modifications and/or additions to the above-described preferred embodiments would be readily apparent to one skilled in the art. By way of example, but not limitation, the round speaker apertures 108 may be replaced with a plurality of louvers, i.e. horizontal slots having an overhanging ledges associated therewith. Such louvers are useful for directing sound. However, when louvers are used, a plate with small holes should be secured behind the louvers on the inside of the door. This will prevent vandals from damaging the speaker by sliding a thin object through the louvers. As a further alternative, the apparatus may include a voice-synthesis chip so that the directory information may be output through a speaker. The apparatus would then be suitable for use by the sight-impaired, who could not read the directory information on a visual display. It is intended that the scope of the present invention extends to all such modifications and/or additions and that the scope of the present invention is limited solely by the claims set forth below.

What is claimed is:

1. A building access control apparatus for use with a security system that is operably connected to a communication network, the access control apparatus comprising:

an input device;

an electronic communication device adapted to be operably connected to the communication network and to the input device;

an output device operably connected to the communication device; and an encoder separate from said input device operably connected to the communication device, said encoder being associated with an alphabetical index and providing an input to the communication device to effect an output on said output device of said building access control apparatus;

an outer housing including a door and defining an interior and an exterior, the exterior of the outer housing including said input device; and a substantially closed inner housing, defining an interior and an exterior, removably mounted within the interior of the outer housing;

wherein said electronic communication device is within the interior of the inner housing.

2. An access control apparatus as defined in claim 1, wherein said input device comprises a plurality of keys.

3. An access control apparatus as defined in claim 1, wherein said output device comprises a visual display.

4. An access control apparatus as defined in claim 1 further comprising an electronic directory of names and codes associated with said names.

5. An access control apparatus as defined in claim 4 wherein said encoder has a plurality of positions, each position corresponding to a particular portion of the alphabet, said visual display displaying at least one entry from said electronic directory corresponding to said particular portion of the alphabet.

6. An access control apparatus as defined in claim 4, wherein said apparatus further comprises a scrolling device to enable a user to scroll through said electronic directory.

7. An access control apparatus as claimed in claim 1, wherein the communication device comprises a microprocessor.

8. A method for locating a desired name of a building occupant and a code associated with the desired name in an electronic directory of an access control apparatus as defined in claim 4, the method comprising:

selecting a particular portion of the alphabet with said encoder; and outputting at least an initial name corresponding to said particular portion of the alphabet on said output device.

9. A building access control apparatus for use with a security system that is operably connected to a telephone system, the access control apparatus comprising:

a plurality of keys arranged in predetermined locations on the building access control apparatus;

an electronic communication device adapted to be operably connected to the telephone system and to the keys;

a microphone operably connected to the communication device;

a speaker operably connected to the communication device;

a visual display operably connected to the communication device;

an encoder separate from said keys operably connected to the communication device, said encoder being associated with an alphabetical index and providing an input to the communication device to effect an output on said visual display;

an outer housing including a door and defining an interior and an exterior, the exterior of the outer housing including said keys; and a substantially closed inner housing, defining an interior and an exterior, removably mounted within the interior of the outer housing;

wherein said electronic communication device is within the interior of the inner housing.

10. An access control apparatus as defined in claim 9 further comprising an electronic directory of names and codes associated with said names.

11. An access control apparatus as defined in claim 10 wherein said encoder has a plurality of positions, each position corresponding to a particular portion of the alphabet, said visual display displaying at least one entry from said electronic directory corresponding to said particular portion of the alphabet.

12. An access control apparatus as defined in claim 11, wherein said encoder comprises a rotary dial that is rotatable to each of said positions.

13. An access control apparatus as defined in claim 11, wherein said apparatus further comprises a scrolling device to enable a user to scroll through said electronic directory.

14. An access control apparatus as defined in claim 13, wherein said scrolling device is a slew switch.

15. An access control apparatus as claimed in claim 9, wherein the communication device comprises a microprocessor.

16. An access control apparatus as claimed in claim 9, wherein the keys comprise keys respectively corresponding to the numbers 0–9.

17. An access control apparatus as claimed in claim 9, wherein said visual display is a single line display.

18. An access control apparatus as claimed in claim 9, wherein said visual display is a multiple line display.

19. A method for locating a desired name of a building occupant and a code associated with the desired name in an electronic directory of an access control apparatus as defined in claim 11, the method comprising:

selecting a particular portion of the alphabet with said encoder; and displaying at least an initial name corresponding to said particular portion of the alphabet on said visual display.

20. A method as defined in claim 19 further comprising the step of scrolling through said electronic directory beginning at said initial name to find the desired name.

21. A method as defined in claim 19 wherein for said particular portion of the alphabet there are a plurality of names stored in alphabetical order in said electronic directory, said step of displaying an initial name comprising selecting an intermediate name from said plurality of names and displaying said intermediate name on said visual display.

* * * * *